July 2, 1940.  O. J. POUPITCH  2,206,852
TESTING MACHINE
Filed Sept. 19, 1935  4 Sheets-Sheet 1
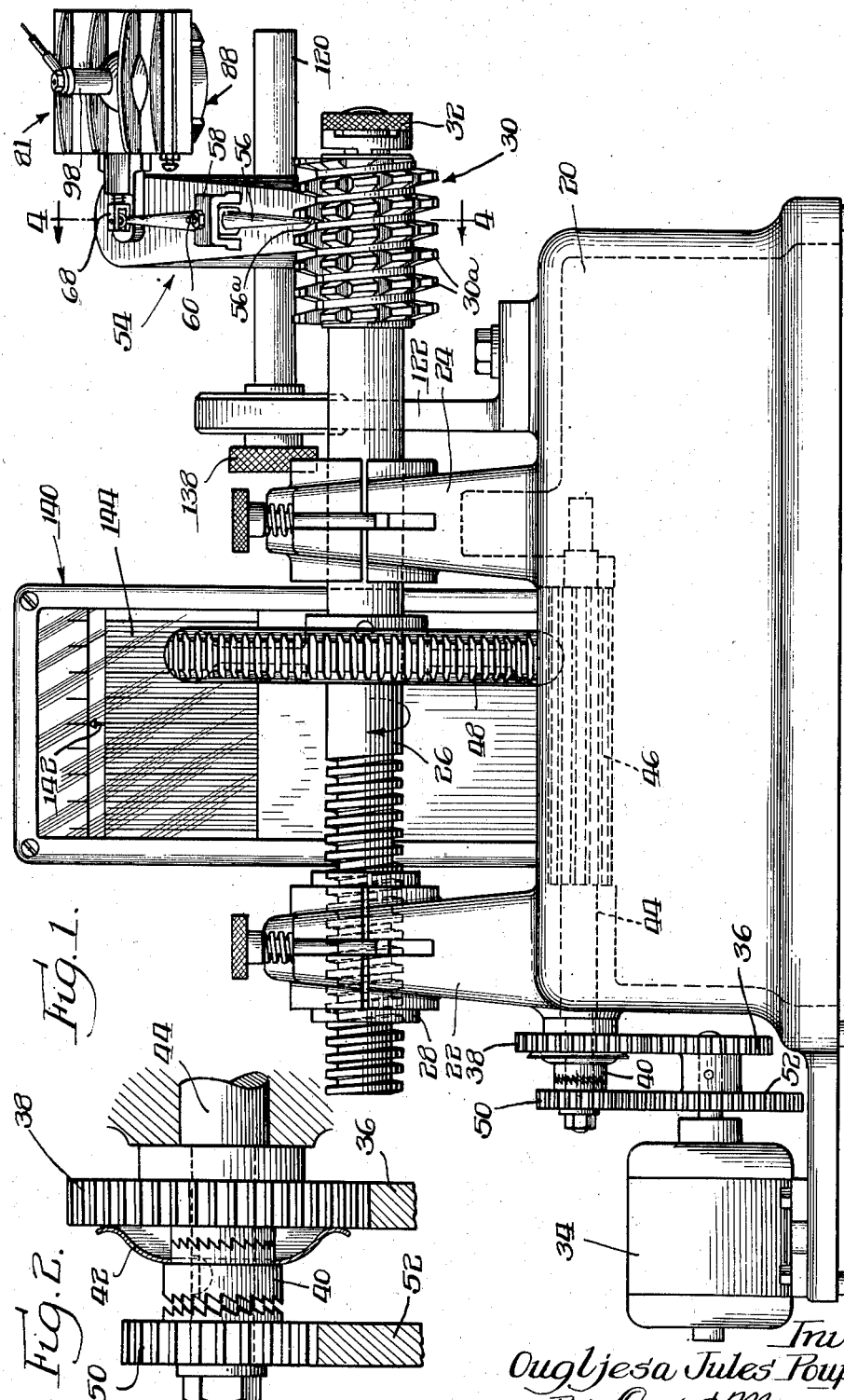
Inventor
Ougljesa Jules Poupitch
By: Cox & Moore attys July 2, 1940. O. J. POUPITCH 2,206,852
TESTING MACHINE
Filed Sept. 19, 1935 4 Sheets-Sheet 2
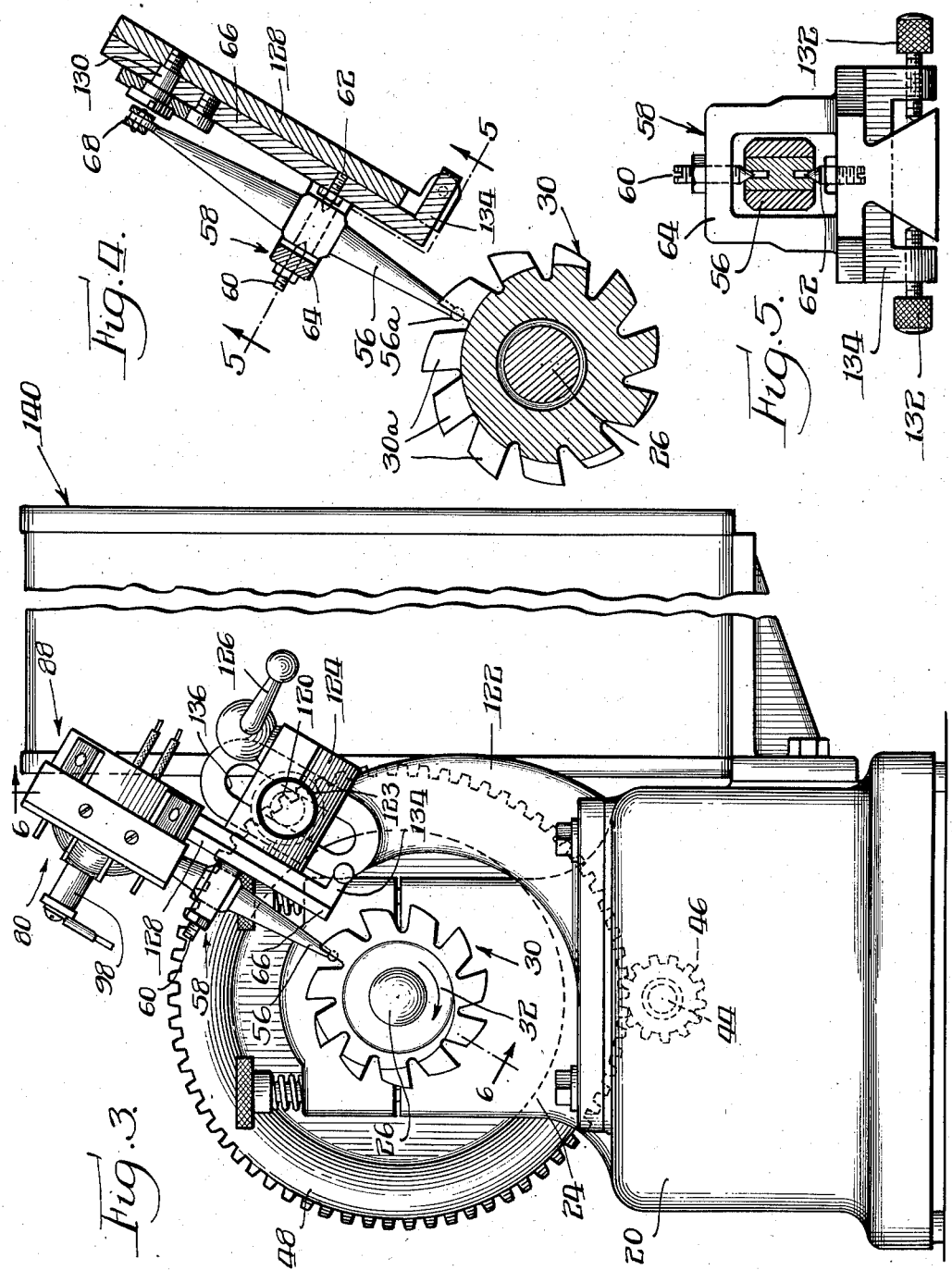
Inventor.
Ougljesa Jules Poupitch
By: Cox & Moow attys.

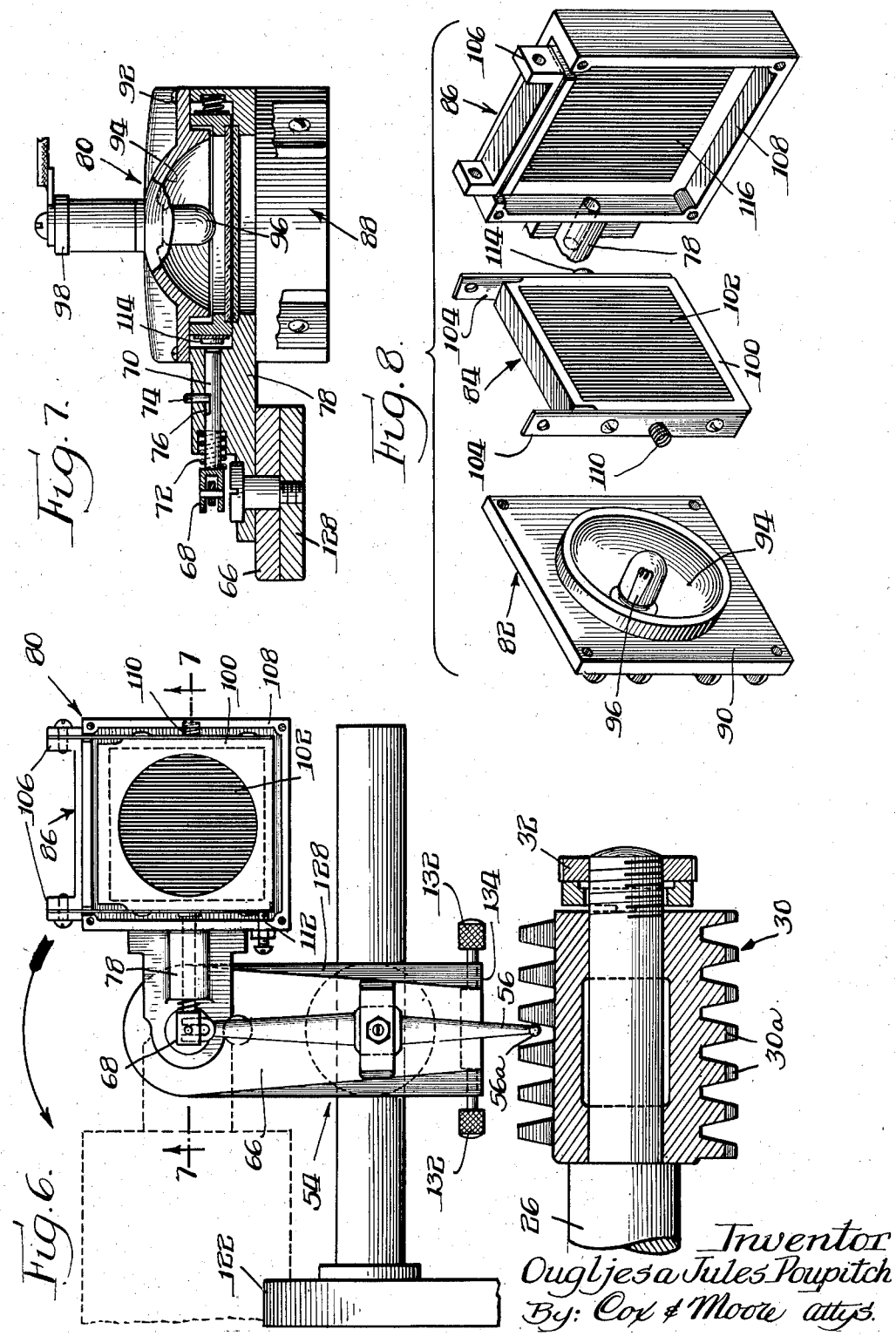

July 2, 1940. O. J. POUPITCH 2,206,852
TESTING MACHINE
Filed Sept. 19, 1935 4 Sheets-Sheet 4
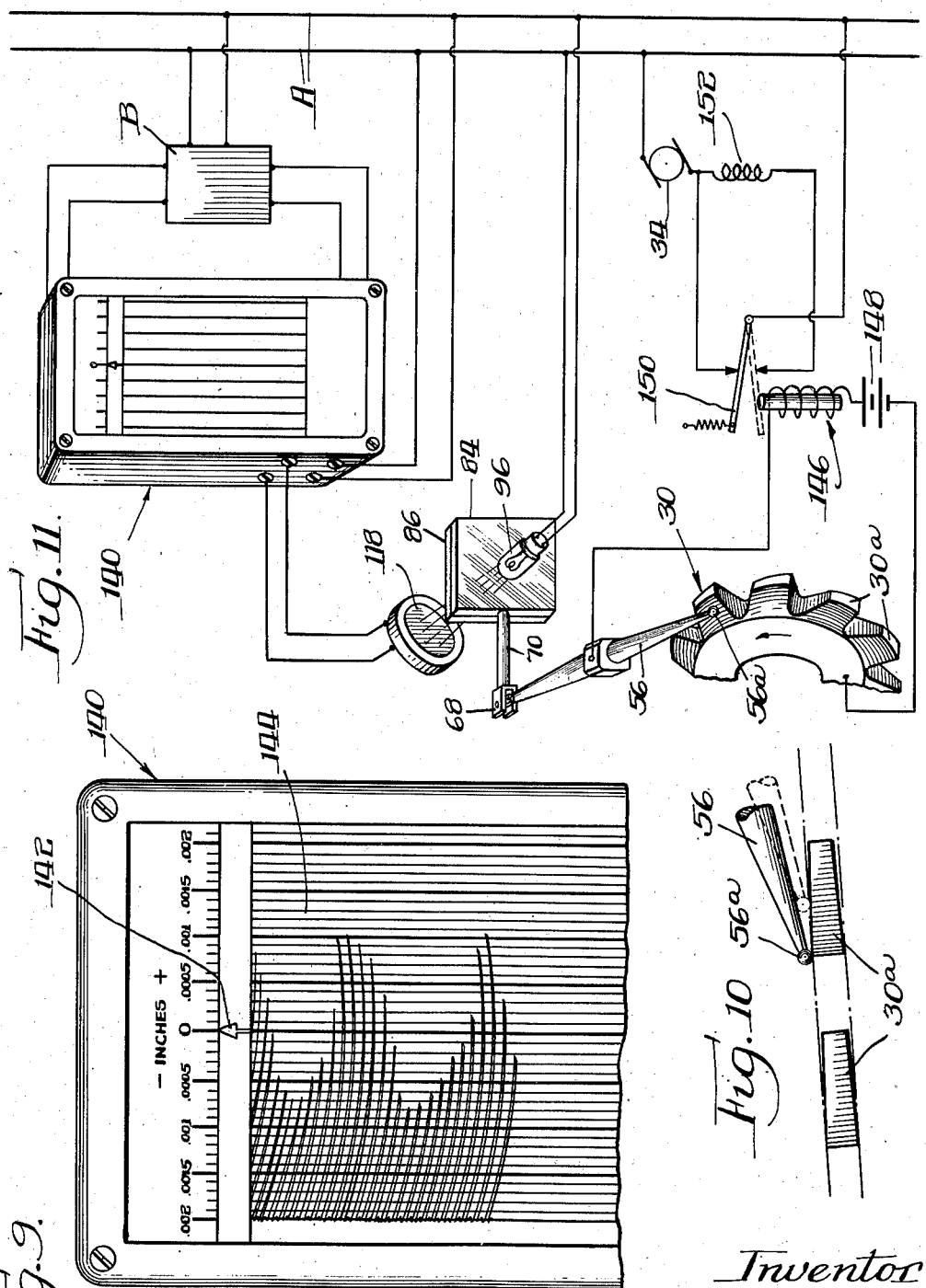
Inventor
Ougljesa Jules Poupitch
By: Cox & Moore attys Patented July 2, 1940

2,206,852

UNITED STATES PATENT OFFICE 2,206,852

TESTING MACHINE

Ougljesa Jules Poupitch, Chicago, Ill., assignor to Illinois Tool Works, Chicago, Ill., a corporation of Illinois Application September 19, 1935, Serial No. 41,335

15 Claims. (Cl. 177—351)

This invention relates generally to testing machines and speed control mechanism therefor, but more particularly to machines for testing the peripheral contours of rotary cutting devices, such as hobs, and to mechanism for controlling the speed of rotation of such devices.

It is a recognized fact in the practice of machine shop methods that production costs are largely dependent upon the speed at which machining, testing, and other operations may be performed with the required degree of accuracy. It is, therefore, one of the important objects of the present invention to provide, in combination with means for supporting and rotating a cutter body, mechanism for controlling the speed of rotation of said cutter body.

More specifically, the invention contemplates the provision, in combination with the rotary cutter support of a machine, for example, a testing machine, of control mechanism for causing the cutter to experience relatively slow rotative speed when the periphery thereof is engaged by an element, such as a contactor, and for causing said cutter to experience faster rotative speed when the periphery thereof is not engaged by the element.

It is a further object to provide a device, as set forth above, wherein said speed control is obtained through the agency of electrically responsive means.

It is a further object to provide a device, as herein mentioned, wherein the rotative cutter body serves as an electrical conductor element in governing the speed of its rotation.

Another object of my invention is to provide a testing machine for cutter bodies and the like of improved practical design, which is extremely simple in construction and which will materially expedite the determination of inaccuracies in the peripheral contour of a cutter.

It is another object of my invention to provide a cutter testing machine, as referred to above, wherein simple and durable means is provided for sensitively indicating minute inaccuracies in surface contour, and to this end I propose to employ a photo-electric arrangement operable in response to very slight movement experienced by a contactor engaging the periphery of the cutter to be tested.

The foregoing and numerous other objects and advantages will be more apparent from the following detailed description when considered in connection with the accompanying drawings, wherein—

Figure 1 is a front elevational view of a testing machine embodying features of my invention;

Figure 2 is an enlarged fragmentary view disclosing the clutch mechanism designed to permit quick return of the cutter body upon the completion of a test;

Figure 3 is a side elevational view of the testing machine, as viewed from the right of Figure 1;

Figure 4 is a fragmentary sectional view taken at right angles to the cutter axis substantially along the line 4—4 of Figure 1 to more clearly illustrate the mounting of the contactor and the position of the contactor ball when the maximum reading on the recording instrument is obtained;

Figure 5 is an enlarged transverse sectional view taken along the line 5—5 of Figure 4 to more clearly illustrate the mounting of the contactor and its associated parts;

Figure 6 is a view taken substantially along the line 6—6 of Figure 3 with the light source removed to more clearly illustrate the screen positioned immediately therebeneath.

Figure 7 is an enlarged transverse sectional view taken substantially along the line 7—7 of Figure 6 disclosing the relative positions of the light source, screen, light responsive cell, and the actuating elements shifted in response to the movement of the contactor arm;

Figure 8 is a perspective view disclosing three of the important elements associated with the light responsive cells, including the light source, the upper screen, and the lower screen;

Figure 9 is a fragmentary elevational view of the front side of the recording apparatus disclosing the manner in which variations in surface contour are recorded or indicated thereby;

Figure 10 is a diagrammatic illustration of the relative positions of the hob teeth and contactor; and Figure 11 is a circuit diagram of the speed control and photoelectric system.

Referring now to the drawings more in detail wherein like numerals have been employed to designate similar parts throughout the various views, it will be seen that one embodiment of the invention contemplates a testing machine having a suitable base or bed 20 with uprights 22 and 24 for supporting a lead screw or shaft 26. Mounted in the upright 22 is a nut 28 adapted to receive the threaded portion of the lead screw or shaft 26. The opposite extremity of the shaft 26 provides a cutter supporting spindle. For purposes of illustration I have shown a hob 30 mounted on the shaft 26 and clamped in position by means of a suitable thumb screw 32. The lead of the thread on the shaft 26 corresponds with the lead of the hob 30, and rotation is experienced by the shaft through the agency of an electric motor 34. This motor 34 drives the shaft 26 at normal or feeding speed through a pair of meshing gears 36 and 38. A clutch collar 40 is normally held in its right position, as indicated in Figures 1 and 2, in engagement with gear 38 against the action of an annular compression spring 42. During such normal operation the motor causes counter-clockwise rotation, as viewed from the right in Figure 2, of the gear 38, and also counter-clockwise rotation of a gear 50 which is driven at a higher rate of speed from the gear 52 connected to the motor shaft. The slippage of the clutch teeth on rapidly rotating gear 50 past the adjacent teeth on clutch 40 holds the clutch against the action of spring 42 in engagement with gear 38. The clutch member 40 is slidably keyed to a shaft 44 and, when said clutch member occupies the position shown in Figures 1 and 2, power from the prime mover 34 is delivered to the shaft 44 which, in turn, connects through an elongated pinion 46 with a large gear 48 carried by the shaft 26. As the motor 34 causes the gear 38 to experience rotation in the counter-clockwise direction, as viewed from the right of Figure 2, the shaft 26 is given a clockwise rotation, as indicated by the directional arrow in Figure 1. This causes the hob 30 to be rotated and moved to the left at a relatively slow or feeding speed.

In order to cause quick reverse movement (namely, to the right) of the hob 30, I prefer to employ a reversible type prime mover. Thus when the prime mover 34 is driven in reverse direction so as to cause the gears 38 and 50 to experience clockwise rotation, when viewed from the right of Figure 2, the clutch member 40 is automatically shifted to the left by spring 42 into engagement with companion teeth provided on the gear 50. The gear 50 is loosely mounted upon the shaft 44 and, as previously stated, is driven from a gear 52 connected as a unit with the gear 36. The ratio between the gears 50 and 52 is such as to cause the lead screw or shaft 26 to experience relatively fast reverse rotation, thereby imparting rapid reverse movement to the supported hob 30.

Attention is now directed to a contactor mechanism indicated generally by the numeral 54 (Figures 1 and 6). This mechanism includes a contactor proper 56, which is pivotally mounted at substantially its midpoint by a pivot mechanism 58 (see particularly Figures 4 and 5). This pivot mechanism 58 includes a pair of oppositely disposed pivot pins 60 and 62 mounted in a suitable bracket 64, said bracket being carried by a plate 66. The lower or free extremity of the contactor or arm 56 provided with the usual contactor ball 56a is adapted to engage the periphery of the teeth 30a of the hob 30. The upper extremity of the contactor or arm is pivotally connected with a yoke 68 of a horizontally shiftable pin 70. This pin 70 is normally urged to the left (Figure 7) through the agency of a coiled spring 72, said pin being secured against further movement to the left through the agency of a pin 74 extending into a slot 76 provided in the pin 70. The pins 70 and 74 are mounted within the frame 78 of a light responsive or photoelectric mechanism, which I have designated generally by the numeral 80.

This photoelectric mechanism 80 is comprised of four major parts, namely, a lamp supporting structure 82, an upper screen mechanism 84, a lower screen mechanism 86, and a photoelectric or light responsive cell device 88 (Figures 7 and 8). The lamp supporting structure 82 includes a plate 90 adapted to be secured in any suitable manner upon the frame 78, for example, by means of screws 92 (Figure 7). This plate 90 is preferably provided with a reflector 94, and supports a light source or lamp 96, which is adapted to be connected to a suitable source of external current supply through the agency of a terminal 98.

The upper screen structure 84 includes a rectangular frame 100 which carries a screen proper 102 constituting a plurality of parallel opaque and transparent lines, preferably of equal width. Extending upwardly from two sides of the frame 100 is a pair of spring members 104 adapted to be secured to a bracket 106 carried by the frame 108 of the lower screen structure 86. The frame portion 78 of the lower screen mechanism 86 receives the shiftable pin 70, and the inner extremity of this pin 70 is adapted, when slightly shifted from the position shown in Figure 7, to engage the side of the frame 100. Interposed between the opposite side of the frame 100 and the adjacent wall of the frame 108 is a suitable coiled spring 110, which normally urges the frame 100 to the left (Figures 6 and 7) against an adjustable stop screw 112. A hardened button 114 is carried by the side of the frame 100 engaged by the inner extremity of the pin 70, as clearly shown in Figures 6 and 7. It will thus be apparent that, when the pin 70 has been moved to the right in response to the shifting of the contactor arm 56, a sufficient distance to move the pin into engagement with the button 114, the upper screen 102 will experience movement to the right (Figures 6 and 7).

The lower screen section 86 carries a screen 116 having opaque and clear lines corresponding with those provided on the companion upper screen 102. Thus when the opaque lines of one screen register with the opaque lines of the other screen, fifty percent of the light from the lamp 96 is received by the light responsive cell 118 of the mechanism 88. As the upper screen 102 is shifted, the amount of light passing through the screens is decreased until all light is completely cut out when the opaque lines of one screen register with the clear lines of the opposite screen. In this manner a range of light transmission from zero to fifty percent may be obtained. The photoelectric mechanism 88 may be of any conventional design, and as illustrated is of the self-generating type.

The contactor and photoelectric mechanism are adjustably supported upon a suitable shaft 120 carried at the upper extremity of a frame 122 (Figures 1 and 6). A base 124 (Figure 3) is adapted to be adjustably secured upon a shaft 120 by tightening a clamping handle 126. As indicated in Figure 3, the base is electrically insulated from the shaft by means of a rubber sleeve 123 interposed therebetween. The base 124, at its upper portion, carries a plate 128, which forms the fixed support for the plate 66 of the contactor mechanism. This plate 66 is pivotally connected to the plate 128 by means of a screw 130 (Figure 4), and is adapted to be adjusted from left to right through the agency of suitable thumb screws 132 (Figure 6) carried within depending bracket arms 134 of the plate 128. It will also be noted that I prefer to support the contactor arm 56 in a radial position with respect to the axis of the hob 30, and I also prefer to have the shaft 120 adjustable within a slot 136 provided in the upright member or frame 122. This slot 136 extends in parallelism with the longitudinal axis of the contactor 56, and thus facilitates the radial adjustment thereof. A thumb screw 138 (Figure 1) serves to secure the contactor supporting shaft 120 in any desired position of adjustment within the slot 136.

From the foregoing it will be apparent that the contactor ball 56a is adapted to engage the side surfaces of the hob teeth 30a, and if the contactor is first adjusted so as to properly engage the side surface of the hob tooth and clockwise rotation is imparted to the hob, as viewed from the right of Figure 1, the contactor arm 56 will be shifted each time the ball 56a comes into engagement with the side surfaces of the hob teeth. A hob provided with perfectly formed teeth would cause the contactor arm to be shifted the same distance each time it engaged a tooth. The degree of movement of the contactor arm 56 is transmitted to the upper or shiftable screen 102, thereby permitting an amount of light to pass through both screens which is proportional to the degree of movement experienced by the contactor. Likewise, the amount of light received by the photoelectric cell 118 will cause a current of proportional value to be generated.

Referring to the electrical diagram in Figure 11, it will be seen that the degree of movement experienced by the contactor arm, and consequently the proportional amount of light received by the photoelectric cell 118, will cause a corresponding or proportional current to flow into a recording mechanism 140. This recording mechanism may be of any conventional design. Inasmuch as the specific structural and electrical characteristics of the recorder 140 are not necessary to an understanding of the present invention, no detailed description thereof will be given. It will suffice to say that this recorder 140 is suitably connected to the main line indicated by the letter A through a suitable amplifier B. It will further suffice to say that this recorder includes an indicator element or pointer 142, which will move in direct response to and in accordance with the degree of movement experienced by the contactor arm 56. I prefer to employ a scale, as indicated in Figure 9, having a zero point and suitable graduations on each side thereof. The deflection of the indicator or needle 142 on either side of the zero point serves to indicate the plus or minus variations in the hob tooth. In order to make a permanent record of these deflections, a conventional chart 144 is employed upon which a graph is drawn through the agency of the indicator 142, which permanently records in graphic form the variations in each hob tooth from the zero point.

In order to prevent a sudden engagement of the side of the hob tooth with the contactor ball 56a, I prefer to permit contact to be established before the cutting edge of the hob tooth reaches the contactor ball. As indicated in Figure 10, contact between the contactor and the hob tooth takes place when the contactor and hob tooth occupy the relation indicated by the dotted line in Figure 10. As the hob tooth continues to move, the indicator arm 56 experiences a continued movement until the maximum point is reached when the ball occupies the full line position shown in Figure 10. In this position the maximum reading is obtained on the recorder.

Referring again to the lower portion of the electrical diagram in Figure 11, attention is directed to the electrical arrangement which I employ to retard the speed of the hob the moment that a hob tooth and contactor engage. In other words, when the hob tooth and contactor occupy the position indicated by the dotted contactor arm of Figure 10, the hob 30 completes a circuit through a solenoid 146 connected with a suitable source of power supply or battery 148. This draws an armature 150 downwardly so as to connect a resistance 152 in the circuit of the motor 34. This causes the motor to experience a decrease in speed, and thus enables the hob tooth and contactor to gradually move past each other. As a result, no sudden or jerky movement is experienced by the contactor and an accurate reading may be made. As soon as the contactor becomes disengaged from the hob tooth, the circuit including the solenoid 146 is broken, thereby enabling the automatic shifting of the armature 150 to the upper position shown in Figure 11, and thus cutting out the resistance 152 from the circuit of the motor 34. This causes the motor to drive the hob at increased speed.

Attention is directed to the fact that this speed control mechanism is in no sense limited for use in testing machines, but is capable for application in any instance where an element is to be contacted with a rotating body, such as a cutting body, and when it is desired to retard the speed of the cutter body after such contact has been made, I refer specifically to such instances as the engagement of a cutting tool with the work where it is essential that during the machining operation a relatively slow speed between the contacting element and the work be maintained. By speeding up the rotation of the cutter body, when the element is disengaged therefrom, the speed with which the machining or testing operation may be performed, is materially increased.

From the foregoing it will also be apparent that my invention contemplates a simple and accurate testing machine, whereby the most minute variations in peripheral contour of a rotary cutter may be instantaneously observed and recorded. Furthermore, this indication in variation is made with the utmost accuracy and over a relatively wide range. It will also be noted that the pin 70 experiences a given amount of travel before it actually causes the screen 102 to experience movement. This prevents the transmission of kinetic energy stored up in the contactor arm to the sensitive screen holder. In other words, when the pin 70 engages the shiftable screen frame, it has lost any undue momentum that it might have received during its initial movement, and thereby causes the screen 102 to be shifted in absolute proportion and conformity with the variation present in the hob tooth.

It will also be apparent that, while I have disclosed specific structural and electrical features herein, the invention is by no means limited to these arrangements, but is capable of other modifications and changes without departing from the spirit and scope of the appended claims.

Having thus described my invention, what I claim as new and desire to secure by Letters Patent is:

1. In a testing machine for a work piece having a surface the contour of which is to be tested, a rotary support for said work piece, means for rotating said support, an operating member engageable with and movable by the surface of the work piece during the rotation of said support, and means for indicating the movements of the operating member, said means comprising a stationary screen, a screen substantially juxtaposed to the stationary screen and movable by the operating member, a light source adapted to direct its rays through both of said screens, a photoelectric cell for receiving the light rays after passage through said screens and an electric indicator operated by said photoelectric cell.

2. In a testing machine, for a work piece having teeth, a support for said work piece, means for rotating and axially moving said support, a contactor successively engageable with the teeth of said work piece, a source of illumination, a housing for said source, a fixed light screen in said housing, a reciprocable light screen in said housing and interposed between said source and the said fixed screen in substantial juxtaposition to said fixed screen, means for connecting said reciprocable screen to said contactor for movement therewith to vary the light transmitted through said screen in accordance with the contour of the teeth of said work piece, a light sensitive member mounted upon said housing on the side of said fixed screen opposite the source of illumination and responsive to the light transmitted through said screen, a circuit for said light sensitive member and means in said circuit responsive to the current through said light sensitive member for giving a visual indication of the variations in the surface contour of the teeth of said work piece.

3. In a testing machine for a work piece having teeth, a support for said work piece, means for rotating and axially moving said support, a contactor successively engageable with the teeth of said work piece upon movement of said support, a bracket upon which said contactor is pivotally supported for oscillation about an axis perpendicular to the axis of rotation of said support, means mounting said bracket for adjustment parallel and perpendicular to the axis of rotation of the support, a source of illumination, a housing for said source mounted upon said bracket, a fixed light screen in said housing, a shiftable screen in said housing interposed between said source and said fixed screen, means connecting said shiftable screen to said contactor for movement therewith to vary the amount of light transmitted through said screen in accordance with variations in the tooth surfaces of said work piece, a light sensitive member mounted upon said housing on the side of said fixed screen opposite to the source of illumination and responsive to the light transmitted through said screens, a circuit for said light sensitive member and means in said circuit responsive to the current through said light sensitive member for giving a current indication proportional to the variations in the tooth surfaces of said work piece.

4. In a testing machine for a peripherally toothed cutter body, a rotary support for said cutter body, a shiftable contactor for engaging the peripheral teeth of the cutter body during rotation of the support, light directing and controlling means including substantially juxtaposed relatively shiftable screens for varying the amount of light transmitted in proportion to the degree of movement experienced by the contactor during the engagement thereof with the supported cutter body, light sensitive means responsive to the light transmitted through said screens, and means controlled by said light sensitive means for indicating the variations in the surface contour of said cutter teeth.

5. In a testing machine for a peripherally toothed cutter body, a rotary support for said cutter body, a shiftable contactor for engaging the peripheral teeth of the cutter body during rotation of the support, substantially juxtaposed relatively shiftable light controlling screens shiftable relatively in response to movement experienced by said contactor upon rotation of said support, a light source, an electrical circuit including a light responsive element adapted to receive light rays from said source of light in accordance with the relative positions occupied by said screens, and current indicating means in said circuit operable in response to the current generated by said light responsive element.

6. In a testing machine for a work piece having teeth, a rotary support for said work piece, a pivoted contactor for engaging the teeth of said work piece and mounted to extend radially with respect to said work piece, said contactor following the surface contour of the teeth of said work piece and being deflected in accordance with the deviations of said surface from a given base line, a light sensitive element, a pair of substantially juxtaposed relatively movable light controlling screens interposed between said source and said element, means including a connection between said contactor and one of said screens for causing relative movement of said screens in proportion to the deflection of said contactor to vary the amount of light falling on said light sensitive element in proportion to the deviation of the surface contour of the teeth of said work piece, and means operatively controlled by said light sensitive element for recording those deviations.

7. In a testing machine for a work piece having teeth, a support for said work piece, means for rotating said support, a contactor successively engageable with the teeth of said work piece upon movement of said support, means for supporting said contactor for adjustment radially with respect to said work piece, said contactor being pivoted on said supporting means for deflection in accordance with the deviations of the toothed surfaces of said work piece from a given base line, a source of illumination, a light sensitive element, means for mounting said source and said element on said contactor supporting means for adjustment therewith, a fixed light screen and a reciprocable light screen carried by said mounting means and interposed between said source and said element, resilient means for urging said reciprocable screen to a normal, undeflected position, means connecting said reciprocable screen to said contactor to vary the amount of light transmitted through said fixed and movable screens in accordance with deviations of the toothed surfaces of said work piece from a given base line, a circuit for said light sensitive element and an electric recorder in said circuit responsive to the current through said light sensitive member for giving a visual record of the deviations of the toothed surfaces of said work piece from a given base line.

8. An instrument for measuring variable distances comprising a movable element responsive to distance variations by contact with material to be measured and means for manifesting movement of said element, said means comprising a source of light, a light sensitive unit affected thereby, said light source and said unit being relatively fixed, said light source providing a relatively fixed beam of light to affect said light sensitive unit, means comprising a shutter device including substantially juxtaposed relatively movable elements arranged between the light source and the light sensitive unit for varying the intensity of the light affecting said unit, said means being controlled by movement of said element, in accordance with distance variations, and means for manifesting variations of an electrical potential produced by said unit to manifest said distance variations.

9. An instrument for measuring various distances comprising a movable element for contacting material to be measured and means for manifesting movement of said element, said means comprising a source of light, a light sensitive unit affected thereby, said light source and said unit being relatively fixed, said light source providing a relatively fixed beam of light to affect said light sensitive unit, means comprising a shutter device including substantially juxtaposed relatively movable elements arranged between the light source and the light sensitive unit for varying the intensity of the light affecting said unit, said means being controlled by movement of said element in accordance with distance variations, and means for manifesting variations of an electrical potential produced by said unit, said intensity varying means comprising relatively movable shutter elements between the light source and the light sensitive unit and operatively connected to said movable element for relative movement thereof to permit more or less light to affect said light sensitive unit in accordance with movement of said element to manifest various distances.

10. An instrument for measuring various distances comprising a source of light, a light sensitive unit, said light source and said unit being relatively fixed, said light source providing a relatively fixed beam of light to affect said light sensitive unit, a shutter device comprising substantially juxtaposed relatively movable elements between the light source and the light sensitive unit adapted to vary the intensity of the light affecting said unit in accordance with relative movement of said elements, movable gauging means for relatively moving said elements, and means for manifesting an electrical potential developed in said unit under the effect of light to manifest various distances gauged by said gauging means.

11. An instrument for measuring various distances comprising a source of light, a light sensitive unit, said light source and said unit being relatively fixed, said light source providing a relatively fixed beam of light to affect said light sensitive unit, a shutter device comprising substantially juxtaposed relatively movable elements between the light source and the light sensitive unit adapted to vary the intensity of the light affecting said unit in accordance with relative movement of said elements, movable gauging means for relatively moving said elements, and means for manifesting an electrical potential developed in said unit under the effect of light to manifest various distances gauged by said gauging means, said relatively movable elements comprising shutters arranged between the light source and the light sensitive unit.

12. An instrument for measuring distances comprising a source of light, a light sensitive unit affected thereby, said light source and said unit being relatively fixed, said light source providing a relatively fixed beam of light to affect said light sensitive unit, movable means comprising a shutter device including relatively movable substantially juxtaposed elements between the light source and the unit for varying the intensity of the light affecting said unit, a movable gauging element for moving said means, and means connected to said sensitive unit to manifest various distances by variations in said unit.

13. An instrument for measuring distances comprising a source of light, a light sensitive unit affected thereby, said light source and said unit being relatively fixed, said light source providing a relatively fixed beam of light to affect said light sensitive unit, movable means comprising a shutter device including relatively movable substantially juxtaposed elements between the light source and the unit for varying the intensity of the light affecting said unit, a movable gauging element for moving said means, and means connected to said sensitive unit to manifest various distances by variations in said unit, said means comprising relatively movable shutter elements between the light source and said unit.

14. A distance-gauging instrument comprising a source of light, a light sensitive unit affected thereby, said light source and said unit being relatively fixed, said light source providing a relatively fixed beam of light to affect said light sensitive unit, and means for varying the intensity of the light affecting said unit, said means comprising relatively movable substantially juxtaposed shutter elements between the light source and said unit, gauging means for relatively moving said shutter elements and means for adjusting one of said shutter elements to a predetermined measuring position to and from which the other shutter element may be relatively moved to vary the intensity of the light passing said shutter elements and means for manifesting distances gauged by said gauging means by manifesting variations in said sensitive unit.

15. An instrument for measuring variable distances comprising a movable gauging member, a shutter device comprising relatively movable substantially juxtaposed shutter elements, said movable gauging member being operatively connected to said shutter device to actuate the same, a light source on one side of said shutter device, a light sensitive unit on the other side of the shutter device, and means for manifesting variations in electrical potential in said light sensitive unit.

OUGLJESA JULES POUPITCH.